United States Patent [19]

Bertus et al.

[11] 4,279,735

[45] Jul. 21, 1981

[54] PASSIVATION OF METALS CONTAMINATING A USED CRACKING CATALYST WITH CERTAIN ANTIMONY CARBONATES AND THEIR THIO ANALOGUES

[75] Inventors: Brent J. Bertus; Dwight L. McKay; H. Wayne Mark, all of Bartlesville, Okla.

[73] Assignee: Phillips Petroleum Company, Bartlesville, Okla.

[21] Appl. No.: 143,674

[22] Filed: Apr. 25, 1980

Related U.S. Application Data

[62] Division of Ser. No. 926,696, Jul. 25, 1978, Pat. No. 4,238,862.

[51] Int. Cl.$^3$ .................... C10G 9/32; C10G 9/16
[52] U.S. Cl. .................... 208/113; 208/52 CT; 208/120; 252/411 R
[58] Field of Search .................... 208/113–121; 252/411 R

[56] References Cited

U.S. PATENT DOCUMENTS

| | | | |
|---|---|---|---|
| 2,129,693 | 9/1938 | Houdry | 208/119 |
| 3,711,422 | 1/1973 | Johnson et al. | 252/414 |
| 3,979,472 | 9/1976 | Butter | 585/408 |
| 4,025,458 | 5/1977 | McKay | 252/416 |
| 4,031,002 | 6/1977 | McKay | 208/113 |
| 4,036,740 | 7/1977 | Readal et al. | 208/120 |
| 4,083,807 | 4/1978 | McKinney et al. | 208/120 X |
| 4,111,845 | 9/1978 | McKay | 208/120 |
| 4,153,536 | 5/1979 | McKay | 208/120 |

FOREIGN PATENT DOCUMENTS 729167  3/1966  Canada .................... 208/120

*Primary Examiner*—Delbert E. Gantz
*Assistant Examiner*—G. E. Schmitkons

[57] ABSTRACT

A used hydrocarbon cracking catalyst is treated with an antimony carbonate to passivate contaminating metals thereon, e.g., vanadium, iron and/or nickel. A process for cracking a hydrocarbon in the presence of the passivated catalyst is also disclosed.

8 Claims, No Drawings

PASSIVATION OF METALS CONTAMINATING A USED CRACKING CATALYST WITH CERTAIN ANTIMONY CARBONATES AND THEIR THIO ANALOGUES

This is a divisional of application Ser. No. 926,696, filed July 25, 1978, now U.S. Pat. No. 4,238,862.

BRIEF DESCRIPTION OF INVENTION

A used cracking catalyst is treated with an antimony carbonate to passivate contaminating metals whenever these metals have been deposited on the catalyst.

DETAILED DESCRIPTION

This invention relates to catalytic cracking of hydrocarbon. In one of its aspects the invention relates to treating a used catalyst to passivate contaminating metals whenever these metals appear on the catalyst. In another of its aspects the invention relates to a used cracking catalyst which has been treated to passivate contaminating metals whenever these appear on the catalyst. In a further aspect the invention relates to a process for the cracking of a hydrocarbon employing a catalyst which can be contaminated with metals tending to deactivate the same, the used catalyst having been treated to passivate such metals or metal whenever these appear on the catalyst.

In one of its concepts the invention provides a method for treating a cracking catalyst to passivate contaminating metals whenever these appear on the catalyst by applying to the used catalyst certain antimony carbonates and their thio analogues. In another of its concepts the invention provides a used catalyst composition which has been modified. In a further concept of the invention it provides a process for the cracking of a hydrocarbon employing a used catalyst which has been modified.

Cracking catalysts, when used to crack oil that contain metals, e.g., vanadium, iron, and nickel, accumulate a deposit of these metals, this decreases the yield of gasoline and increases yields of hydrogen and coke.

This invention discloses a method to passivate said metals on the used catalysts bearing them. According to the invention the method involves the addition of certain antimony carbonates to the used catalyst, e.g., to the metals-contaminated catalyst.

Metals-contaminated cracking catalysts that are passivated according to the invention are any that are active to crack hydrocarbons in the absence of added hydrogen. Included are catalysts or contact masses which are amorphous silica/alumina and compositions that contain zeolites—synthetic or natural.

Such cracking catalyst materials can be any of those cracking catalysts conventionally employed in the catalytic cracking of hydrocarbons boiling above 400° F. (204° C.) for the production of gasoline, motor fuel blending components and light distillates. These conventional cracking catalysts generally contain silica or silica-alumina. Such materials are frequently associated with zeolitic materials. These zeolitic materials can be naturally occurring, or they can be produced by conventional ion exchange methods such as to provide metallic ions which improve the activity of the catalyst. Zeolite-modified silica-alumina catalysts are particularly applicable in this invention. Examples of cracking catalysts into or onto which antimony can be incorporated include hydrocarbon cracking catalysts obtained by admixing an inorganic oxide gel with an aluminosilicate and aluminosilicate compositions which are strongly acidic as a result of treatment with a fluid medium containing at least one rare earth metal cation and a hydrogen ion, or ion capable of conversion to a hydrogen ion. The catalytic cracking material employed will generally be in particulate form having a particle size principally within the range of about 10 to about 200 microns.

If desired, the cracking catalyst can contain a combustion promoter such as platinum or chromium.

The catalytic cracking materials can vary in pore volume and surface area. Generally, however, the cracking catalyst will have a pore volume in the range of about 0.1 to about 1 ml/g. The surface area of this catalytic cracking material generally will be in the range of about 50 to about 500 $m^2/g$.

The described catalysts are generally employed for treating hydrocarbon feedstocks at elevated temperatures to produce distillates such as gasoline and higher-boiling hydrocarbon fuels, e.g., kerosine, diesel fuel, burning oils and the like.

Passivation, as herein described, is considered to be effected satisfactorily whenever one of the following obtains. Gasoline yield is improved and/or hydrogen and/or coke production is reduced.

It is an object of this invention to provide a method for passivating a catalyst having contaminating metals thereon. It is another object of the invention to treat the catalyst suitable for cracking a hydrocarbon, e.g., a hydrocarbon oil, to passivate contaminating metals, e.g., vanadium, iron and/or nickel to render the same more effective for its intended use. It is a further object of the invention to produce a modified or treated used catalyst suitable for cracking on which contaminating metals are passivated. It is a further object of the invention to provide an improved hydrocarbon cracking operation.

Other aspects, concepts, objects and the several advantages of the invention are apparent from a study of this disclosure and the appended claims.

According to the present invention a used catalyst suitable for cracking hydrocarbon, e.g., a hydrocarbon oil, is treated by addition of an antimony carbonate thereto, so that contaminating metals, e.g., vanadium, iron and/or nickel thereon, will be passivated.

Also according to the invention there is provided the treated catalyst.

Still according to the invention there is provided a hydrocarbon cracking operation employing the modified or treated catalyst of the invention.

The quantity of antimony to use to modify or to passivate the metal, when it has been deposited on the catalyst, should add about 0.01 to 8 weight percent, preferably about 0.02 to 2 weight percent, of antimony to the catalyst. These concentrations are expressed as the element, and are based on the weight of catalyst prior to treatment.

A variety of methods can be used to apply the antimony carbonates to the catalyst. They can be added as finely divided solid and dispersed by rolling, shaking, stirring, etc. Or, they can be dissolved in a suitable solvent, aqueous or organic, and the resulting solution used to impregnate the cracking catalyst—followed by drying to remove the solvent. Or, they can be dissolved or suspended in the oil that is the feedstock to the cracking process where, by virtue of their negligible vapor pressure at reaction conditions, they are retained on the catalyst.

The antimony compounds that are effective in this invention are the carbonates—(RXCXX)$_3$Sb—wherein each X is independently selected from oxygen and sulfur, and R preferably contains not more than 18 carbon atoms and can be alkyl, alkadienyl, alkenyl, cycloalkyl, cycloalkenyl, or aryl radical, or a combination of radicals such as alkaryl, aralkyl, alkenylaryl, and the like.

Examples of suitable carbonates, including the thio analogues, are antimony tris(propylcarbonate), antimony tris(O-propyl thiocarbonate), antimony tris(O-propyl dithiocarbonate), antimony tris(S-propyl dithiocarbonate), antimony tris(S-propyl trithiocarbonate), antimony tris(ethyl carbonate), antimony tris(benzylcarbonate), and antimony tris(O-octadecylthiocarbonate).

In the examples the following compounds were used: antimony trilaurate(tridodecanoate), antimony tris(thioacetate), antimony tris(O-propyl dithiocarbonate), antimony tris(dithiopentanoate), and antimony tritallate.

Feedstocks amendable to treatment by the cracking catalyst of this invention are, generally, oils having an initial boiling point above 204° C. This includes gas oils, fuel oils, topped crude, shale oil, and oils from coal and/or tar sands.

However the oils are derived or obtained, the invention is applicable to passivate the metals on the catalyst when thereon.

The cracking process may utilize a fixed catalyst bed or a fluidized catalyst—this latter is preferred.

Specific conditions in the cracking zone and the regeneration zone of a fluid catalytic cracker depend on the feedstock used, the condition of the catalyst, and the products sought. In general, conditions in the cracking zone include:

Temperature: 427°–649° C. (800°–1200° F.)
Contact time: 1–40 seconds
Pressure: 10 kiloPascals to 21 megaPascals (0.1 to 205 atm.)
Catalyst:oil ratio: 3/1 to 30/1, by weight and conditions in the regenerator include:
Temperature: 538°–816° C. (1000°–1500° F.)
Contact Time: 2–40 minutes
Pressure: 10 kiloPascals to 21 megaPascals (0.1 to 205 atm.)
Air rate (at 16° C., 1 atm.): 100–250 ft$^3$/lb coke, or 6.2–15.6 m$^3$/kg coke It is presumed that the feedstocks to the catalytic cracker, as described above, will contain a significant concentration of vanadium, iron, and/or nickel whose presence will affect adversely the catalyst's selectivity.

Since these metals become concentrated in the least volatile fractions of the feedstocks, the invention is especially valuable for cracking heavy oils.

The quantity of added antimony required to passivate vanadium iron, and/or nickel is related directly to their concentration in the feedstock. The following table relates the total concentration in the feedstock of these metals to the concentration of added antimony on the cracking catalyst to passivate effectively these adventitious metals.

| Total V, Fe, Ni, in Feedstock, ppm | Antimony added to Catalyst, Wt%* |
|---|---|
| 40–100 | 0.05–0.8 |
| 100–200 | 0.1–1 |
| 200–300 | 0.15–1.5 |
| 300–800 | 0.2–2 |

EXAMPLE I

A commercial cracking catalyst (designated Catalyst 0) that had been used in a commercial fluid catalytic cracker until it had attained equilibrium composition with respect to metals accumulation (catalyst was being removed from the process system at a constant rate) was used to demonstrate passivation. The catalyst, being a synthetic zeolite combined with amorphous silica/alumina (clay), was predominantly silica and alumina. Concentrations of other elements together with pertinent physical properties are shown in Table I.

TABLE I

| | |
|---|---|
| Surface area, m$^2$g$^{-1}$ | 74.3 |
| Pore volume, ml g$^{-1}$ | 0.29 |
| Composition, wt % | |
| Nickel | 0.38 |
| Vanadium | 0.60 |
| Iron | 0.90 |
| Cerium | 0.40 |
| Sodium | 0.39 |
| Carbon | 0.06 |

A portion of this used, metals-contaminated catalyst was treated with antimony as follows. A solution, prepared by diluting 3.35 g of antimony trilaurate in benzene (see above) with 30 ml of benzene, was stirred into 25 g of the used catalyst. Solvent was removed by heating, with stirring on a hot plate at about 260° C. This treatment added 0.50 wt % antimony to the catalyst. The treated catalyst was then prepared for testing by aging it.

EXAMPLE II

Preparation of antimony tris(thioacetate)-treated catalyst. Antimony tris(thioacetate) was prepared by a double decomposition reaction between antimony trichloride and thioacetic acid (CH$_3$COSH). A slurry containing 14.1 g (0.0618 moles) of SbCl$_3$ in 100 cc of benzene was dehydrated by distilling it until production of the water-benzene azeotrope ceased. To this slurry, in a flask fitted with a reflux condenser and a dropping funnel, 11.42 g (0.15 mole) of thioacetic acid was added dropwise to the boiling solution. When addition was complete this solution was cooled; by calculation it contained 3.93 weight percent antimony. A 3.18 g portion of this solution diluted with about 30 cc of benzene, was stirred into 25 g of Catalyst 0 (see Example I). Solvent was removed by heating, with stirring, on a hot plate at about 260° C. This treatment added 0.50 wt. % antimony to the catalyst. The catalyst was processed through 10 aging cycles exactly as described in Example I. It was then ready for testing as Catalyst II.

EXAMPLE III

This is an example according to the invention.
Antimony tris(O-propyl dithiocarbonate) was prepared by a double decomposition reaction between antimony trichloride and potassium O-propyl dithiocarbonate. The latter was prepared as follows. To 22.2 g (0.395 moles) of potassium hydroxide was added 100 g.

(1.67 moles) of n-propanol. This mixture was allowed to reflux for one hour; after it had cooled to room temperature 46 g (0.60 moles) of carbon disulfide was added. Product precipitation began immediately. When addition of the carbon disulfide was complete the mixture was heated to reflux for 30 minutes, cooled in an ice bath, and filtered. The yellow crystals were washed with ethanol), then with cyclohexane; they weighed 35.3 g (0.202 moles).

Antimony trichloride was dried by suspending 14.1 g (0.0618 moles) in about 200 cc tetrahydrofuran (THF) and distilling off about half of the solvent. To it was added 26.15 g (0.15 moles) of potassium propyl dithiocarbonate suspended in THF, while the antimony salt was being refluxed in THF. Refluxing continued about 45 minutes, during which time the mixture had turned orange. After cooling, a considerable quantity of solids was removed by filtration. The filtrate contained a calculated 3.57 wt. % antimony as antimony tris(O-propyl dithiocarbonate). A 3.50 g portion of this solution, diluted with 30 cc of benzene, was stirred into 25 g of Catalyst 0. Solvent was removed by heating, with stirring, on a hot plate. This treatment added 0.50 wt. % antimony to the catalyst. The catalyst was processed through 10 aging cycles as follows. The catalyst, in a quartz reactor, was fluidized with nitrogen while being heated to 482° C., then it was fluidized with hydrogen while the temperature was raised from 482° to 649° C. Maintaining that temperature, fluidization continued for 5 minutes with nitrogen, then for 15 minutes with air. The catalyst was then cooled to about 482° C., still being fluidized with air. The catalyst at about 482° C. was fluidized with nitrogen for one minute, then heated to 510° C. during two minutes while fluidized with hydrogen, then maintained at 510° C. for one minute while fluidized with nitrogen, then heated to about 649° C. for 10 minutes while fluidized with air, and then cooled to about 482° C. during 0.5 minute while fluidized with air. After 10 such cycles it was cooled to room temperature while being fluidized with nitrogen, and was ready for testing as Catalyst I.

Catalyst 0 and the treated Catalyst I were tested in a fixed bed reactor using Kansas City gas oil as feedstock to the cracking step. The cracking reaction was carried out at about 482° C. and atmospheric pressure for 0.5 minutes; regeneration was at about 593° C. and atmospheric pressure; the reactor was purged with nitrogen before and after each cracking step.

Properties of the Kansas City gas oil used in the cracking steps are summarized in Table II.

TABLE II

| API gravity at 15.6° C. | 30.2° | |
| --- | --- | --- |
| BMCI | 30.1 | |
| Carbon residue, Ramsbottom | 0.23 | wt. % |
| Analysis for some elements | | |
| Carbon | 88.3 | wt % |
| Hydrogen | 11.8 | wt % |
| Sulfur | 0.20 | wt % |
| Oxygen | 0.075 | wt % |
| Nitrogen | 0.08 | wt % |
| Vanadium | 9 | ppm |
| Nickel | 0.25 | ppm |
| Molecular wt. (number average) | 328 | |
| Distillation (by ASTM D-1160-61) | | |
| 2% | 288° C. | |
| 10 | 320 | |
| 20 | 340 | |
| 30 | 357 | |
| 50 | 399 | |
| 70 | 458 | |
| 90 | 542 | |
| Kinematic viscosity (by ASTM D-445-65) | | |
| at 54.4° C. | 62.5 | centistokes |
| at 98.9° C. | 39.3 | centistokes |

Results of testing the catalysts as described are summarized in Table III. (see Table III on page 10)

In the example on page 10, the metals-contaminated catalyst that had been treated with the antimony-containing compound showed a higher gasoline yield and lower coke and hydrogen production than did the untreated catalyst. Conversion of feedstock increased 5.9, gasoline yield increased 19, coke yield decreased 16, and hydrogen yield decreased 47%.

U.S. Pat. No. 3,711,422, Marvin M. Johnson and Donald C. Tabler, Jan. 16, 1973, discloses and claims restoring the activity of a cracking catalyst with a compound of antimony, e.g., antimony triphenyl. U.S. Pat. Nos. 4,025,458 May 24, 1977 and 4,031,002, June 21, 1977, Dwight L. McKay, disclose and claim passivating metals on unused cracking catalysts with antimony compounds, e.g., a phosphorodithioate, as described in the patents.

TABLE III

| | | | Yield | | |
| --- | --- | --- | --- | --- | --- |
| Catalyst | Catalyst: oil weight ratio | Conversion vol% of Feed | Coke, wt% of feed | SCF $H_2$/bbl feed converted | Gasoline vol% of Feed |
| 0 | 7.13 | 72.4 | 9.4 | 707 | 44.3 |
| I | 7.23 | 76.7 | 7.9 | 373 | 52.6 |

Reasonable variation and modification are possible within the scope of the foregoing disclosure and the appended claims to the invention the essence of which is that contaminating metals, e.g., vanadium, iron and/or nickel, on a used cracking catalyst are passivated by treating the used catalyst with an antimony carbonate, as described herein.

We claim:

1. A method for passivating a used hydrocarbon cracking catalyst which comprises adding to said used catalyst at least one antimony carbonate wherein the carbonate is at least one having the formula $(RXCXX)_3Sb$, wherein each X is independently selected from oxygen and sulfur, and R contains not more than 18 carbon atoms.

2. A method according to claim 1 wherein the cracking catalyst contains at least one of silica, silica-alumina and a zeolite.

3. A method according to claim 1 wherein the catalyst is treated to passivate at least one of nickel, iron and/or vanadium, whenever it appears on the catalyst.

4. A process for cracking a hydrocarbon feedstock which comprises contacting the same under cracking conditions with a used cracking catalyst which has been modified with a modifying amount of a treating agent selected from at least one of an antimony carbonate in an amount sufficient to passivate metals which tend to inactivate said used catalyst for effective cracking when said metals are on said catalyst.

5. A method according to claim 1 wherein the antimony carbonate is at least one carbonate selected from the following antimony tris(propylcarbonate), antimony tris(O-propyl thiocarbonate), antimony tris(O-propyl dithiocarbonate), antimony tris(S-propyl dithiocarbonate), antimony tris(S-propyl trithiocarbonate), antimony tris(ethyl carbonate), antimony tris(benzyl-carbonate), antimony tris(O-octadecylthiocarbonate) and the thio analogues thereof.

6. A process for cracking a hydrocarbon in the presence of a hydrocarbon cracking catalyst which has been treated by at least one carbonate of claim 5.

7. A method according to claim 1 wherein the antimony carbonate is antimony tris(O-n-propyl dithiocarbonate).

8. A process according to claim 4 wherein the antimony carbonate is antimony tris(O-n-propyl dithiocarbonate).

* * * * *